US 8,748,051 B2
Jun. 10, 2014

(12) United States Patent
Robb et al.

(10) Patent No.: US 8,748,051 B2
(45) Date of Patent: Jun. 10, 2014

(54) ADAPTIVE LOADING OF A FUEL CELL

(75) Inventors: Gary M. Robb, Honeoye Falls, NY (US); Steven G. Goebel, Victor, NY (US); Daniel I. Harris, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 562 days.

(21) Appl. No.: 12/725,974

(22) Filed: Mar. 17, 2010

(65) Prior Publication Data

US 2011/0229783 A1    Sep. 22, 2011

(51) Int. Cl.
*H01M 8/04* (2006.01)

(52) U.S. Cl.
USPC ............... 429/429; 307/87; 320/138; 429/90; 429/432

(58) Field of Classification Search
CPC . H01M 8/04; H01M 8/04223; H01M 8/0432; H01M 8/04388; H01M 8/04447; H01M 8/04552; H01M 8/04559; H01M 8/04582; H01M 8/04589; H01M 8/0491; H01M 8/0494; H01M 8/04955; H01M 8/04544; H01M 8/04567; H01M 8/04865; H01M 8/04873; H01M 8/04888; H01M 8/0488; Y02E 60/50; H02J 3/12
USPC ............... 320/137, 138; 340/636.1, 340/636.12–636.19, 660–664; 429/61, 429/428–432, 452, 90; 701/22; 702/57, 702/63–65, 79
See application file for complete search history.

(56) References Cited

U.S. PATENT DOCUMENTS

| 7,261,962 | B1* | 8/2007 | Czajkowski et al. | 429/423 |
| 7,655,331 | B2* | 2/2010 | Adams et al. | 429/410 |
| 7,939,213 | B2* | 5/2011 | Ishikawa et al. | 429/432 |
| 8,277,997 | B2* | 10/2012 | LaVen et al. | 429/446 |
| 2006/0246329 | A1* | 11/2006 | Gopal et al. | 429/18 |
| 2008/0131742 | A1* | 6/2008 | An et al. | 429/13 |
| 2008/0160370 | A1* | 7/2008 | Masse et al. | 429/23 |
| 2008/0311437 | A1 | 12/2008 | Sienkowski et al. | |
| 2009/0081496 | A1* | 3/2009 | Robb et al. | 429/14 |
| 2009/0198396 | A1* | 8/2009 | Rodriguez et al. | 701/22 |
| 2010/0262325 | A1* | 10/2010 | Fernandez | 701/22 |
| 2011/0086286 | A1* | 4/2011 | Ganapathy et al. | 429/432 |
| 2011/0189568 | A1* | 8/2011 | Minamiura et al. | 429/428 |
| 2011/0229783 | A1* | 9/2011 | Robb et al. | 429/432 |
| 2011/0269039 | A1* | 11/2011 | Wilkinson et al. | 429/428 |

FOREIGN PATENT DOCUMENTS

DE    102007026003 A1    12/2008

* cited by examiner

*Primary Examiner* — Joseph Drodge
(74) *Attorney, Agent, or Firm* — Fraser Clemens Martin & Miller LLC; J. Douglas Miller

(57) ABSTRACT

A fuel cell system is disclosed with a fuel cell stack having a plurality of fuel cells, the fuel cell stack including an external electrical circuit adapted to control current from the fuel cell stack, a sensor for measuring at least one of an environmental condition affecting the fuel cell stack and a characteristic of the fuel cell stack, wherein the sensor generates a sensor signal representing a measurement of the sensor, and a processor for receiving the sensor signal, analyzing the sensor signal, and controlling an adaptive load applied to the external electrical circuit based upon the analysis of the sensor signal.

16 Claims, 3 Drawing Sheets

ADAPTIVE LOADING OF A FUEL CELL

FIELD OF THE INVENTION

The invention relates to fuel cell systems. More particularly, the invention is directed to a fuel cell system and a method for mitigating periods of high electrode potential to protect the fuel cell from damaging currents.

BACKGROUND OF THE INVENTION

A fuel cell has been proposed as a clean, efficient and environmentally responsible power source for electric vehicles and for various other applications. In particular, the proton exchange membrane (PEM) fuel cell has been identified as a potential alternative for a traditional internal-combustion engine used in modern vehicles.

The PEM fuel cell includes three basic components: a cathode, an anode and an electrolyte membrane. The cathode and anode typically include a finely divided catalyst, such as platinum, supported on carbon particles and mixed with an ionomer. The electrolyte membrane is sandwiched between the cathode and the anode to form a membrane electrode assembly (MEA). The MEA is often disposed between porous diffusion media (DM) which facilitate a delivery of gaseous reactants, typically hydrogen and oxygen from air, for an electrochemical fuel cell reaction. Plates on each side of the DM and MEA provide reactant and coolant flow, collectively creating a fuel cell. Individual fuel cells provide a relatively low direct-current electrical potential, but can be stacked together in series to form a fuel cell stack that delivers any desired electrical potential. Thus, the fuel cell stack is capable of generating a quantity of electricity sufficient to power a vehicle or to power other applications.

During a typical operation of the fuel cell stack, hydrogen enters and flows through the individual fuel cells from one end of the fuel cell stack to another. The ends of the fuel cell stack are often referred to as the wet and dry ends, with the hydrogen generally flowing from the wet end to the dry end. During periods of non-operation, a quantity of air accumulates in the anode flow fields of the fuel cell stack. Upon start-up of the fuel cell stack, hydrogen is supplied to the anode flow fields. The supplied hydrogen creates a "hydrogen-air front" that locally increases the Reference Hydrogen Electrode (RHE) potential on portions of the cathode that are opposite the air filled portions of the anode. High RHE potential on the cathode electrode can rapidly corrode the cathode electrode, and is known to degrade fuel cell performance.

Importantly, during startup of a fuel cell with high electrical load demand, the non-uniform distribution of hydrogen on the anodes of the fuel cell stack can lead to a phenomenon known as "cell reversal." Cell reversal occurs when a load is applied to the fuel cell stack and when at least one fuel cell in the fuel cell stack lacks sufficient hydrogen to support a current generated by the other fuel cells in the fuel cell stack supplied with adequate hydrogen. The other cells in the stack cause a locally higher electric potential to that portion of the anode lacking sufficient hydrogen, leading to an oxidation of the carbon support in this region of the anode of the reversed cell that may result in a rapid voltage degradation of the fuel cell, significantly reducing the useful life of the fuel cell stack. In particular, a corrosion of the carbon substrate of the anode electrode of the starved cell, wherein CO and $CO_2$ are formed, occurs.

As some level of hydrogen fill is provided to the cell during startup even for a blocked or flow restricted cell due to compression of gas, a minimum level of charge can be drawn before cell reversal can occur. As a result, a minimum amount of charge may be drawn from the cell without requiring cell voltage feedback. However, fixed resistance loads may not match the minimum charge draw.

In order to mitigate carbon corrosion during startup, known systems have employed a low-impedance circuit to the terminals of the fuel cell stack during start-up. In such systems, a circuit with a low-impedance shorting resistor, for example, is used to minimize the localized cathode electrode potential of the cells in the fuel cell stack. The lower the resistance, the lower the potential observed on the cathode electrode, thereby decreasing the rate of carbon corrosion on the cathode electrode of the fuel cell stack. For the low impedance circuit system to work properly, however, each fuel cell in the fuel cell stack must have substantially equal quantities of hydrogen for the duration of the dead-short, to avoid localized anode starvation in cells deficient in hydrogen. In addition, a low-impedance circuit typically requires costly high current capacity components or else requires some mechanism to slow the hydrogen-air front. The low impedance circuit must also be tuned for each cell, particularly with respect to catalyst area and overall capacitance of the cell.

A fixed resistive load has also been used to suppress stack voltage during startup. However, the fixed resistive load requires the addition of electrical components to engage the fixed resistive load. Further, the resistive load itself adds to the cost and complexity of the system, creating reliability concerns. A fixed resistive load does not allow the electric load to be adjusted based on the needs of the stack or the fuel cell system. For example, some cell voltage monitoring equipment may be powered by the cell voltages, requiring some level of cell voltage to energize the voltage monitoring equipment upon startup.

A number of fuel cell systems and methods are known in the art for optimizing the uniform distribution of hydrogen to the anode flow fields of the fuel cell stack during the start-up operation. Thus, for example, it is known in the art to rapidly purge the anodes of the accumulated air with hydrogen and hydrogen-gas mixtures during startup conditions, to minimize the time that the hydrogen-air front exists on the anodes during startup. The purge is often designed to substantially and evenly fill the anode inlet header with hydrogen without exhausting an excess of hydrogen from the fuel cell system. An illustrative purge method is disclosed in applicant's co-pending U.S. application Ser. No. 11/762,845, incorporated herein by reference in its entirety.

It is also known in the art to control delivery of hydrogen and hydrogen-inert gas mixtures to provide a variable anode flow rate during a start-up of the fuel cell system, wherein the fuel cell system and the method minimize an anode fill time. One such method is disclosed in applicant's co-pending U.S. application Ser. No. 12/725,771, incorporated herein by reference in its entirety. In combination with a dead short, the system described for controlling the delivery of reactants to the anode electrodes allows the electrical current to be varied. However, such a method requires a high precision control of both the delivery of reactants to the anode electrode and application of the dead short.

There is a continuing need for a responsive and controllable fuel cell system and method that protects against localized corrosion within a fuel cell during startup by minimizing the electric potential within the fuel cell without requiring additional components or cost. Desirably, the fuel cell stack and method minimizes the effects of a non-uniform distribution of hydrogen during startup and militates against a voltage degradation of the fuel cell stack.

SUMMARY OF THE INVENTION

Concordant and consistent with the present invention, a fuel cell system and a method for facilitating an adaptive and variable electrical load applied to a fuel cell system during startup, while also minimizing degradation of the fuel cell system due to a non-uniform hydrogen distribution across an anode, has surprisingly been discovered.

In one embodiment, a fuel cell system comprises: a fuel cell stack having a plurality of fuel cells, the fuel cell stack including an external electrical circuit, a sensor for measuring at least one of an environmental condition affecting the fuel cell stack and a characteristic of the fuel cell stack, wherein the sensor generates a sensor signal representing a measurement of the sensor; and a processor for receiving the sensor signal, analyzing the sensor signal, and controlling an adaptive load applied to the fuel cell external electrical circuit based upon the analyzed sensor signal.

In another embodiment, a fuel cell system comprises: a fuel cell stack having a plurality of fuel cells, the fuel cell stack including an external electrical circuit, a sensor for measuring at least one of a volume of fluid injected into an anode supply manifold, a voltage across at least one fuel cell, a current supplied from the fuel cell stack, a shut-down time period, and an environmental factor, wherein the sensor generates a sensor signal representing a measurement of the sensor; and a processor for receiving the sensor signal, analyzing the sensor signal, and controlling an adaptive load applied to the fuel cell external electrical circuit based upon the analyzed sensor signal.

The invention also provides methods for applying an adaptive load to the fuel cell.

One method comprises the steps of: providing a fuel cell stack having a plurality of fuel cells, the fuel cell stack including an external electrical circuit, measuring at least one of an environmental condition affecting the fuel cell stack and a characteristic of the fuel cell stack; and controlling an adaptive load applied to the fuel cell external electrical circuit based upon an analysis of at least one of the environmental condition measured and the characteristic of the fuel cell stack measured.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
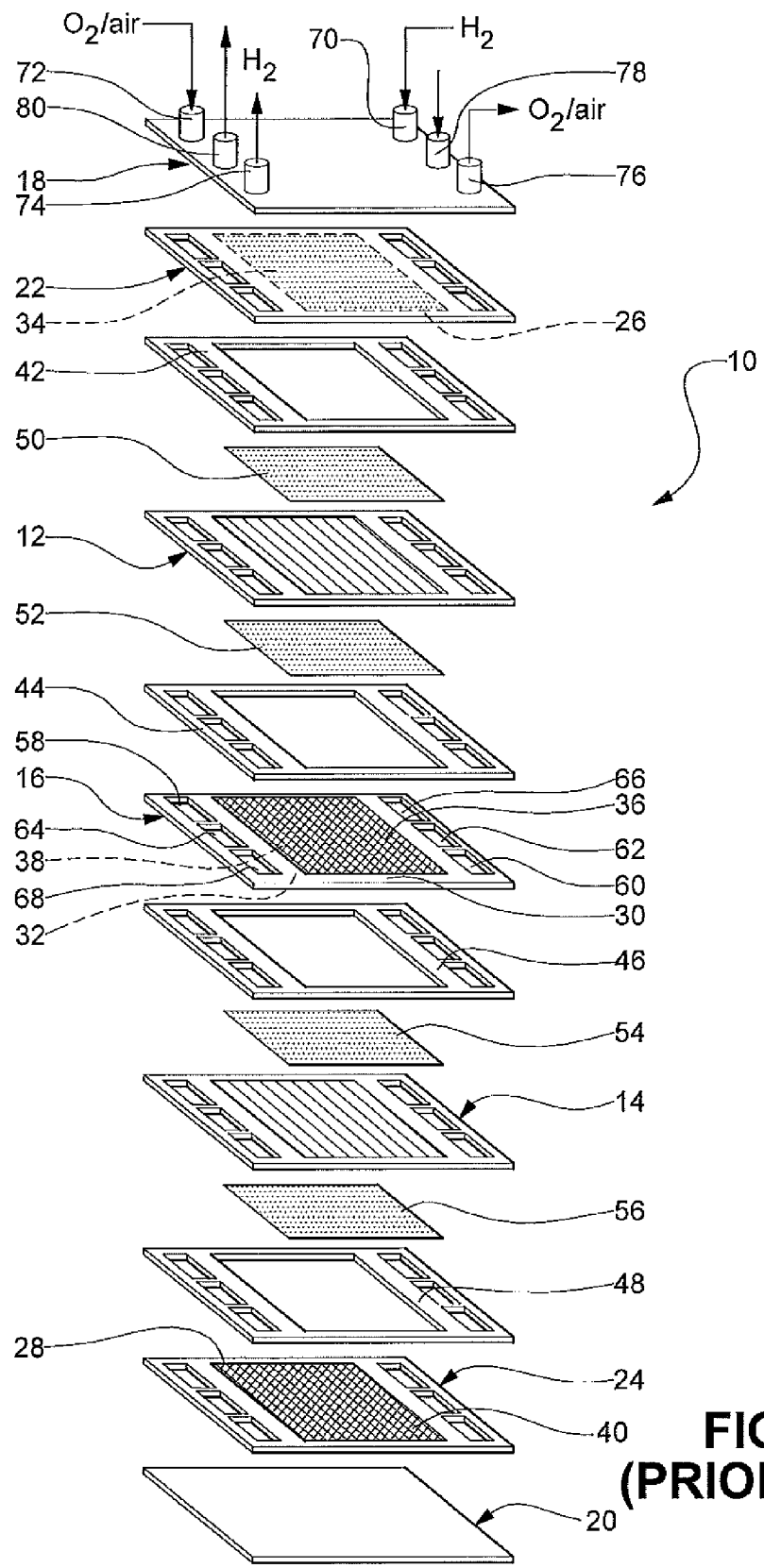
FIG. 1 is a schematic exploded perspective view of a PEM fuel cell stack as is known in the art.

FIG. 1 illustrates a PEM fuel cell stack 10 according to the prior art. For simplicity, only a two-cell stack (i.e. one bipolar plate) is illustrated and described in FIG. 1, it being understood that a typical fuel cell stack will have many more such cells and bipolar plates. The fuel cell stack 10 includes a pair of membrane electrode assemblies (MEAs) 12, 14 separated by an electrically conductive bipolar plate 16. The MEAs 12, 14 and the bipolar plate 16 are stacked between a pair of clamping plates 18, 20 and a pair of unipolar end plates 22, 24. The clamping plates 18, 20 are electrically insulated from the end plates 22, 24 by a gasket or a dielectric coating (not shown). A working face 26, 28 of each of the unipolar end plates 22, 24, as well as the working faces 30, 32 of the bipolar plate 16, respectively include a plurality of grooves or channels 34, 40, 36, 38 adapted to facilitate the flow of a fuel such as hydrogen and an oxidant such as oxygen therethrough. Nonconductive gaskets 42, 44, 46, 48 provide seals and an electrical insulation between the components of the fuel cell stack 10. Gas-permeable diffusion media 50, 52, 54, 56 such as carbon or graphite diffusion papers substantially abut each of an anode face and a cathode face of the MEAs 12, 14. The end plates 22, 24 are disposed adjacent the diffusion media 50, 56 respectively. The bipolar plate 16 is disposed adjacent the diffusion media 52 on the anode face of the MEA 12 and adjacent the diffusion media 54 on the cathode face of the MEA 14.

As shown, each of the MEAs 12, 14, the bipolar plate 16, the end plates 22, 24, and the gaskets 42, 44, 46, 48 include a cathode supply aperture 58, a cathode exhaust aperture 60, a coolant supply aperture 62, a coolant exhaust aperture 64, an anode supply aperture 66, and an anode exhaust aperture 68. A cathode supply manifold is formed by the alignment of adjacent cathode supply apertures 58 formed in the MEAs 12, 14, the bipolar plate 16, the end plates 22, 24, and the gaskets 42, 44, 46, 48. A cathode exhaust manifold is formed by the alignment of adjacent cathode exhaust apertures 60 formed in the MEAs 12, 14, the bipolar plate 16, the end plates 22, 24, and the gaskets 42, 44, 46, 48. A coolant supply manifold is formed by the alignment of adjacent coolant supply apertures 62 formed in the MEAs 12, 14, the bipolar plate 16, the end plates 22, 24, and the gaskets 42, 44, 46, 48. A coolant exhaust manifold is formed by the alignment of adjacent coolant exhaust apertures 64 formed in the MEAs 12, 14, the bipolar plate 16, the end plates 22, 24, and the gaskets 42, 44, 46, 48. An anode supply manifold is formed by the alignment of adjacent anode supply apertures 66 formed in the MEAs 12, 14, the bipolar plate 16, the end plates 22, 24, and the gaskets 42, 44, 46, 48. An anode exhaust manifold is formed by the alignment of adjacent anode exhaust apertures 68 formed in the MEAs 12, 14, the bipolar plate 16, the end plates 22, 24, and the gaskets 42, 44, 46, 48.

A hydrogen gas is supplied to the fuel cell stack 10 through the anode supply manifold via an anode inlet conduit 70. An oxidant gas is supplied to the fuel cell stack 10 through the cathode supply manifold of the fuel cell stack 10 via a cathode inlet conduit 72. An anode outlet conduit 74 and a cathode outlet conduit 76 are provided for the anode exhaust manifold and the cathode exhaust manifold, respectively. A coolant inlet conduit 78 and a coolant outlet conduit 80 are in fluid communication with the coolant supply manifold and the coolant exhaust manifold to provide a flow of a liquid coolant therethrough. It is understood that the configurations of the various inlets 70, 72, 78 and outlets 74, 76, 80 in FIG. 1 are for the purpose of illustration, and other configurations may be chosen as desired.

Figure 2:
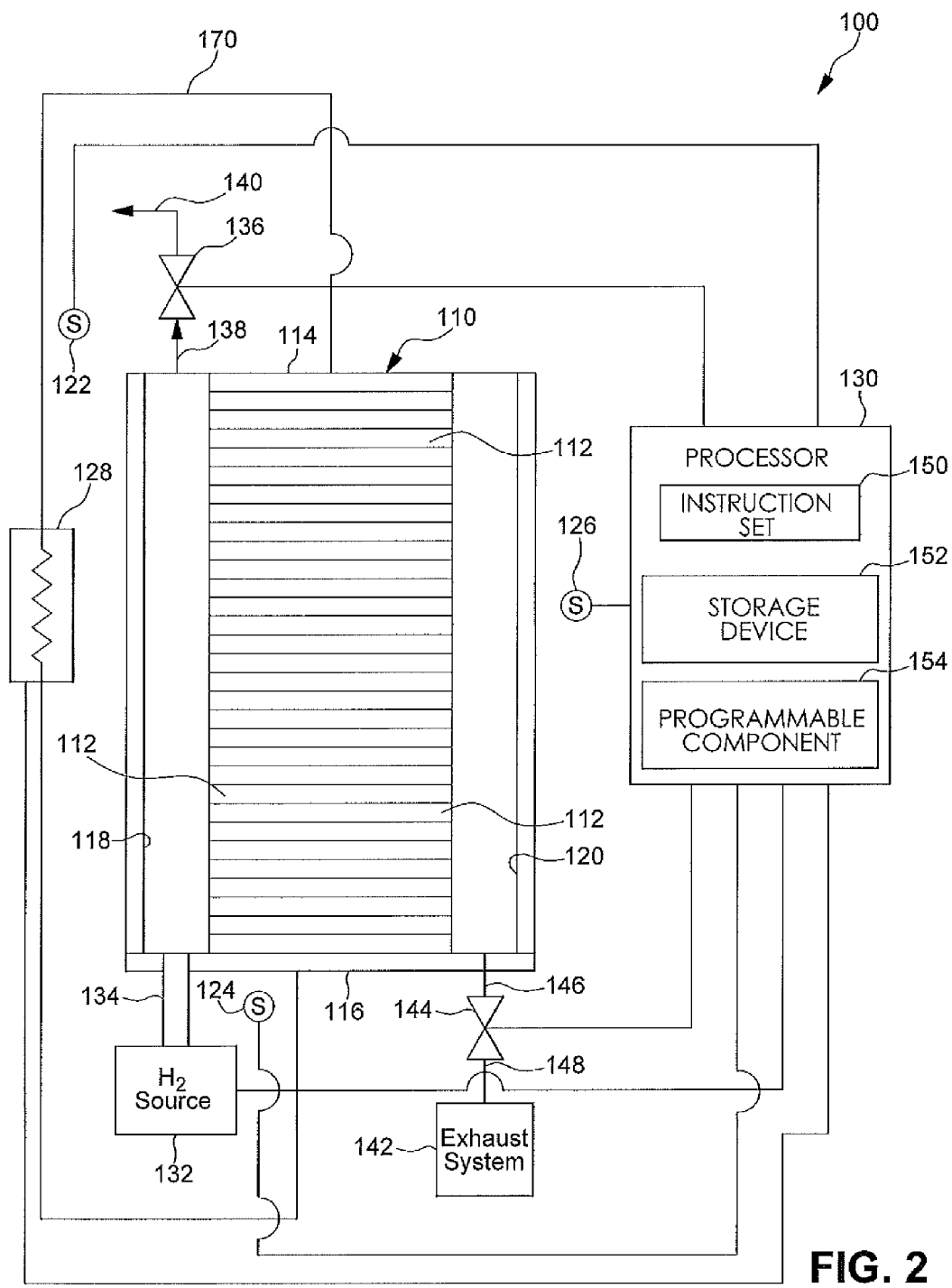
FIG. 2 is a schematic cross-sectional elevational view of a fuel cell system according to an embodiment of the present invention.

FIG. 2 shows an anode side of a fuel cell system 100 according to an embodiment of the invention. The fuel cell system 100 includes a fuel cell stack 110 having a plurality of fuel cells 112. Each of the fuel cells 112 has an anode (not shown) and a cathode (not shown) with an electrolyte membrane (not shown) disposed therebetween. The fuel cell stack 110 further includes a first end 114 and a second end 116. As described herein, the first end 114 is known as the "dry end" and the second end 116 is known as the "wet end."

In the embodiment shown, the fuel cell system 100 includes an anode supply manifold 118, an anode exhaust manifold 120, a plurality of sensors 122, 124, 126, an electrical load 128, and a processor 130. It is understood that additional components and systems may be included in the fuel cell system 100 such as a recycle sub-system, for example.

The anode supply manifold 118 is in communication with the anodes of the fuel cells 112 and provides fluid communication between a source of hydrogen 132 and the fuel cells 112. It is understood that other fluid sources may be used such as nitrogen and air, for example. As shown, the anode supply manifold 118 receives a flow of gaseous hydrogen through an anode inlet conduit 134 from the source of hydrogen 132. The anode inlet conduit 134 defines a volume between the source of hydrogen 132 and the anode supply manifold 118. It is understood that the anode inlet conduit 134 may have any desired cross-sectional area and may further include a chamber and isolation and control valves, for example. As illustrated, the fuel cell system 100 includes a first valve 136, also known as a purge valve, in fluid communication with the anode supply manifold 118. The first valve 136 is disposed at the first end 114 of the fuel cell stack 110, spaced from the anode inlet conduit 134. The first valve 136 includes an inlet 138 for receiving a fluid flow and an outlet 140 for exhausting a fluid when the first valve 136 is in an open position.

The anode exhaust manifold 120 of the fuel cell system 100 provides fluid communication between the anodes of the plurality of fuel cells 112 and an exhaust system 142. The anode exhaust manifold 120 receives the fluid flowing through the anodes of the fuel cells 112. The fluid caused to flow through the anodes may be gaseous hydrogen, air, or water, for example. A second valve 144 is in fluid communication with the anode exhaust manifold 120 and is disposed at the second end 116 of the fuel cell stack 110. The second valve 144 facilitates purging or flushing of a fluid from the anode exhaust manifold 120. It is understood that the second valve 144 may be disposed at the first end 114 of the fuel cell stack 110, if desired. It is further understood that the second valve 144 may flush fluid to a cathode inlet (not shown), for example. Specifically, the second valve 144 includes an inlet 146 for receiving a fluid flow and an outlet 148 for exhausting a fluid when the second valve 144 is in an open position.

The sensors 122, 124, 126 provide a means to measure characteristics of the fuel cell system 100 and a surrounding environment. While three sensors 122, 124 and 126 are depicted in FIG. 2, it is understood that more or fewer sensors may be included within the fuel cell stack 110. In operation, at least one of the sensors 122, 124, 126 is adapted to measure a voltage across at least one of the fuel cells 112 or a current flowing from at least one of the fuel cells 112. Another one of the sensors 122, 124, 126 is typically adapted to measure a characteristic of the fluid flowing into the anode supply manifold 118 such as a cumulative volume of the fluid, for example. Another one of the sensors 122, 124, 126 is adapted to measure an environmental characteristic affecting the fuel cell stack 110. As non-limiting examples, the environmental characteristic may be one of a temperature, a time period, a composition of a fluid flowing through the anode side of the fuel cell stack 110, an age of the fuel cell stack 110, and a pressure level at various points in the fuel cell system 100. It is understood that other characteristics and system parameters may be measured such as a current flowing through the electrical load 128, for example. It is further understood that each of the sensors 122, 124, 126 is adapted to transmit a sensor signal to the processor 130, wherein the sensor signal represents the measurement data of an associated one of the sensors 122, 124, 126.

The processor 130 illustrated is in communication with the sensors 122, 124, 126, and with the electrical load 128. As such, the processor 130 is adapted to receive each of the sensor signals transmitted from the sensors 122, 124, 126, analyze the sensor signals, and control a magnitude of the electrical load 128 applied to the fuel cell stack 110 in response to the analysis of the sensor signals.

The electrical load 128 is in electrical communication with the fuel cell stack 110, and is part of an external electrical circuit 170 (FIG. 3) that is electrically connected to a plurality of terminals (not shown) of the fuel cell stack 110, and is adapted to receive electrical current from each fuel cell 112. To minimize corrosion within the fuel cell stack 110 during startup, the electrical load 128 is controlled by the processor 130 to maintain the average potential of each fuel cell below about 0.7 Volts. Favorable results have been obtained where the potential of each fuel cell is maintained at least below 0.8 Volts, or when a current draw from each fuel cell is about 0.07 Amps/cm$^2$. In practice, this is accomplished by the processor 130 setting the magnitude of the electrical load 128 sufficiently high, thereby reducing the electrical potential of the fuel cell stack 110, and as necessary, reducing the electrical potential of any individual fuel cell 112. Alternatively, in instances of decreasing hydrogen flow to one or more cells in the fuel cell stack, and the resulting decreasing electrical potential of one or more cells in the fuel cell stack 110, the processor 130 sets the magnitude of the electrical load 128 sufficiently low to reduce current flow from the fuel cell stack to the external electrical circuit 170, thereby increasing the electrical potential of the low potential cells in the fuel cell stack and preventing cell polarity reversal.

Figure 3A:
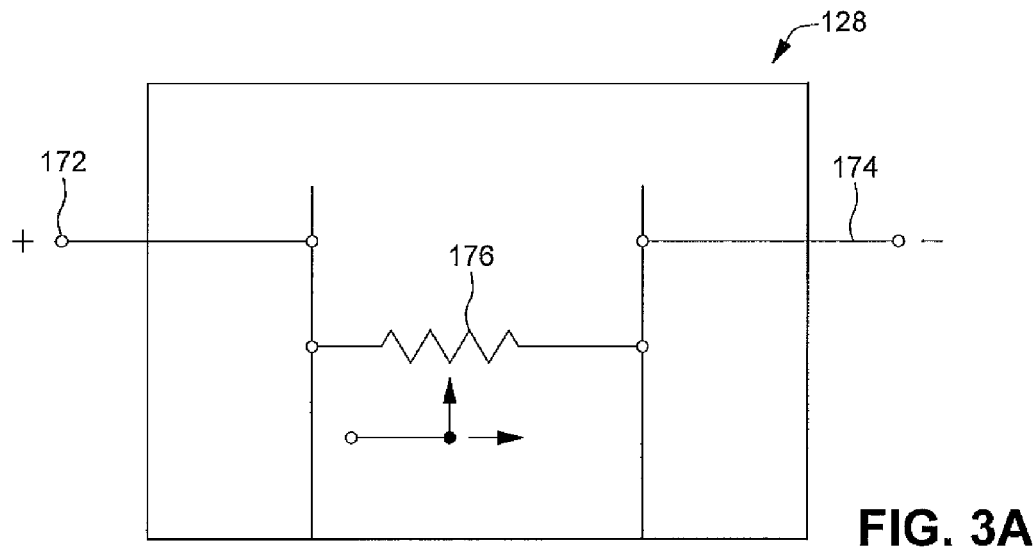
FIGS. 3A and 3B are schematic views of embodiments of an adaptive load and a method for applying the adaptive load to a fuel cell system according to the present invention.
Figure 3B:
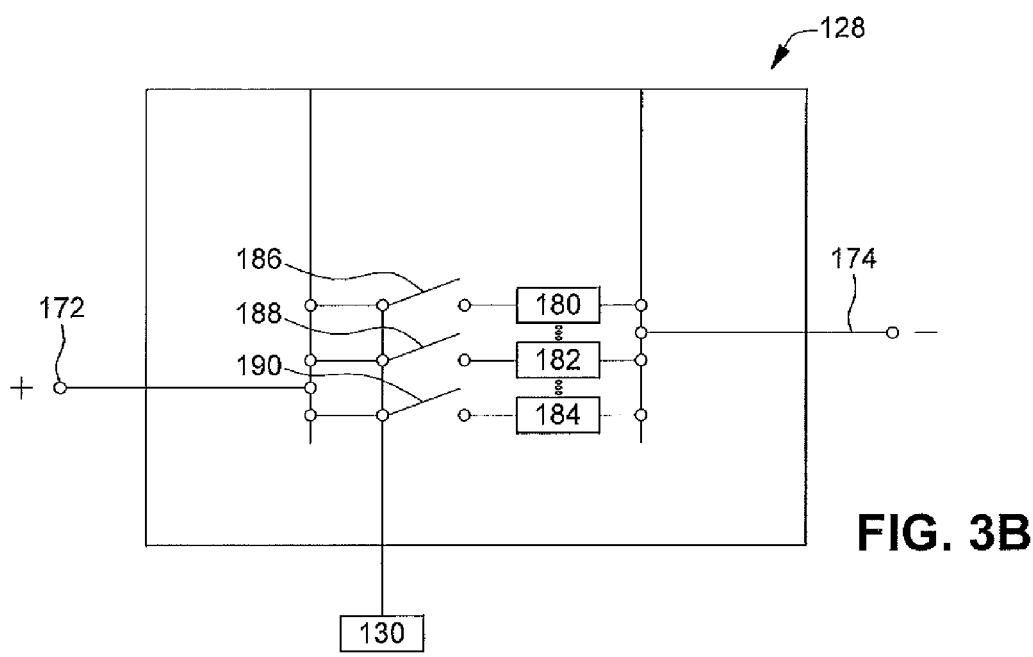

As seen in FIGS. 3A and 3B, the electrical load includes at least one positive terminal 172 and at least one negative terminal 174, forming an electrical circuit that conducts electrical current from each fuel cell 112 and delivers it to the electrical load 128. In one embodiment of the invention, shown in FIG. 3A, the electrical load 128 is a variable resistor 176 capable of being adjusted to place a desired resistive load on the fuel cell stack 110. The variable resistor 176 may be set to a discrete value, or may be continuously varied by the processor 130 to ensure that the anodes maintain a predetermined potential. In particular, the processor 130 would ensure that the resistive value of the variable resistor 176 does not fall so low that the fuel cell stack 110 experiences too much load, thereby leading to a damaging cell reversal phenomenon. The variable resistor 176 may be one of a potentiometer, a trimmer, a rheostat, a varistor, or any other adjustable resistive device, as desired.

In another embodiment, shown in FIG. 3B, the electrical load 128 may comprise a plurality of external devices 180, 182, 184. While only three external devices 180, 182, 184 are shown, it is understood that the actual number of such devices available may vary as desired. Preferably, the external devices 180, 182, 184 comprise system devices attached to the fuel cell for use during nominal operation. As a non-limiting example, in a fuel cell intended to power a motor vehicle, any of the electrical devices of the vehicle may be used as an external device 180, 182, 184, such as a radiator fan, a cabin heater, a fuel cell stack heater, an air compressor, a battery charger, an illumination device, or the like. In this embodiment, the processor 130 is in communication with the sensors 122, 124, 126, and with the electrical load 128, comprised of external devices 180, 182, 184. As such, the processor 130 is adapted to receive each of the sensor signals transmitted from the sensors 122, 124, 126, analyze the sensor signals, and control the magnitude of the electrical load 128 applied to the fuel cell stack 110 in response to the analysis of the sensor signals. The magnitude of the electrical load 128 is adjusted by the processor 130 selectively engaging or varying the external devices 180, 182, 184. It is understood that the processor 130 may selectively engage or vary none, one, or more than one of the external devices 180, 182, 184 in order to achieve the desired magnitude of the electrical load 128. It is also understood that each of the external devices 180, 182, 184 may have different resistive characteristics than the other external devices. As a result, the processor 130 also determines, based on the sensor signals from the sensors 122, 124, 126, which of the external devices 180, 182, 184 to engage to ensure that the electrical potential of the fuel cell stack 110 remains below predetermined limits. To minimize corrosion within the fuel cell stack 110 during startup, engagement of the external devices 180, 182, 184 is controlled by the processor 130 to maintain the potential of each cell below 0.7 Volts. Favorable results have been obtained where the potential of each cell is maintained at least below 0.8 Volts, or when a current draw from each fuel cell is about 0.07 Amps/cm$^2$. As illustrated in schematic form in FIG. 3B, the processor 130 is in communication with and controls a bank of switches 186, 188, 190, each one of which engages one of the external devices 180, 182, 184. It is understood that the switches 186, 188, 190 need not be actual switches, and instead may be directly controlled or actuated by the processor 130.

Thus, the processor 130, in combination with the sensors 122, 124, 126 and with the external devices 180, 182, 184, allow for adaptively loading the fuel cell stack 110. It is understood that the adaptive loads provided by the external devices 180, 182 and 184 may be coupled to individual fuel cells 112, or may be coupled with the fuel cell stack 110, in order to affect the electric potential of each fuel cell 112 without causing cell reversal.

The adaptive loading of the fuel cell stack 110 therefore maintains a desired potential on each fuel cell 112 during start-up, increasing current demand conditions, and decreasing current demand conditions, or in no-load conditions. The adaptive loading of the fuel cell stack is also highly controllable, and provides a substantially immediate response to any sensed condition.

As shown in FIG. 2, the processor 130 analyzes and evaluates the sensor signals based upon an instruction set 150. The instruction set 150, which may be embodied within any computer readable medium, includes algorithms, formulas, tabular data and processor executable instructions for configuring the processor 130 to perform a variety of tasks. It is understood that the processor 130 may execute a variety functions such as controlling the functions of the sensors 122, 124, 126 in addition to controlling the electrical load 128.

In certain embodiments, the processor 130 may include a storage device 152. The storage device 152 may be a single storage device or may be multiple storage devices. Furthermore, the storage device 152 may be a solid state storage system, a magnetic storage system, an optical storage system or any other suitable storage system or device. It is understood that the storage device 152 is adapted to store the instruction set 150. Other data and information may be stored in the storage device 152, as desired.

The processor 130 may further include a programmable component 154. It is understood that the programmable component 154 may be in communication with any other component of the fuel cell system 100 such as the sensors 122, 124, 126, for example. In certain embodiments, the programmable component 154 is adapted to manage and control processing functions of the processor 130. Specifically, the programmable component 154 is adapted to control the analysis of the sensor signals. It is understood that the programmable component 154 may be adapted to store data and information on the storage device 152, and retrieve data and information from the storage device 152. In one embodiment, the processor 130 is a proportional-integral-derivative (PID) controller, or any other control-loop feedback mechanism, wherein the processor controls the electrical load 128 in response to the sensor signals of the sensors 122, 124, 126. In another embodiment, the processor 130 implements a logic-based feedback mechanism. It is understood that the control-loop may be continuous, or may be active only in response to predetermined signals received from the sensors.

Specifically, each of the sensors 122, 124, 126, measure characteristics and levels at various positions in the fuel cell system 100. Each of the sensors 122, 124, 126, transmits the sensor signal representing the measured data and information to the processor 130. Once received, the processor 130 analyzes the data and information represented by each of the sensor signals and controls the electrical load 128 of the external electrical circuit 170. It is understood that the processor 130 may directly control the application of the variable resistor 176 in one embodiment, or may directly or indirectly control the connection of the external devices 180, 182, 184 to the external electrical circuit 170 in another embodiment.

As a non-limiting example, as hydrogen gas flows into the active areas of the fuel cells 112, a range of cell voltages (between a minimum cell voltage and a maximum cell voltage) increases until at least one of the fuel cells 112 has excess hydrogen. Thus, at least one of the sensors 122, 124, 126 measures a voltage across at least one of the fuel cells 112 and the processor 130 selectively regulates application of the electrical load 128 in response to the measured voltage. In certain embodiments, the magnitude of the electrical load 128 remains constant until a voltage peak is detected. Thereafter, the magnitude of the electrical load 128 is modified as required to minimize the electrical potential across at least one of the fuel cells 112 without causing cell reversal. In other embodiments, the magnitude of the resistive load is selectively modified until steady-state operation of the fuel cell stack 110 is reached.

In another example, as hydrogen flows into the active areas of the fuel cells 112, an electric current supplied from the fuel cell stack 110 to the electrical load 128 represents a function of an oxidation state of the anode and cathode electrodes. Because the anode is being filled with hydrogen, the anode current-carrying capability is increasing throughout the anode fill. Due to a lack of fresh air supplied to the cathode, the ability of the cathode to produce current is decreasing. As a result, the processor 130 acts to increase the impedance on the external electrical circuit 170 by selectively disconnecting any of the external devices 180, 182, 184 or by increasing the magnitude of the variable resistor 176, to ensure that the electrical potential of the fuel cell stack 110, or of the individual fuel cells 112, does not fall below a minimum value.

The adaptive loading of the present invention is intended to replace the low-impedance circuit method during start-up or a fixed resistive load without adding additional components, and further provides increased controllability and responsiveness to electrical potential differences between individual fuel cells of a fuel cell stack. The adaptive loading of the present invention also may be used in combination with any stack flush or purge procedure applied during start-up of a fuel cell to control the electrical potential of individual fuel cells 112 and to prevent localized corrosion of the anodes and cathodes thereof. The fuel cell system 100 and the method for adaptive loading also minimize degradation of the fuel cell system due to electrical potential imbalances within the cells of the fuel cell system during startup.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A fuel cell system comprising:
   a fuel cell stack having a plurality of fuel cells, the fuel cell stack including an external electrical circuit adapted to receive current from the fuel cell stack;
   a plurality of sensors measuring a characteristic of fluid flowing into the fuel cell stack, an environmental condition affecting the fuel cell stack, and a voltage across at least one of the fuel cells, wherein each of the sensors generates a sensor signal representing a measurement of the sensor; and
   a processor for receiving the sensor signals, analyzing the sensor signals, and controlling an adaptive load applied to the external electrical circuit based upon the analyzed sensor signals, the adaptive load operable to maintain a desired potential on each fuel cell during start-up, wherein the adaptive load comprises a plurality of external devices and a magnitude of the adaptive load is controlled by the processor selectively engaging the external devices.

2. The fuel cell system according to claim 1, wherein the sensors obtain a measurement of a current through the external electrical circuit and a measurement of a current through the adaptive load, and wherein the adaptive load applied to the fuel cell electrical circuit is modified in response to the measurements.

3. The fuel cell system according to claim 1, wherein the processor includes a control-loop feedback mechanism.

4. The fuel cell system according to claim 1, wherein one of the sensors obtains a measurement of the environmental condition, wherein the environmental condition is at least one of an ambient temperature, a shut-down time period, a composition of a fluid flowing through the fuel cell stack, an age of the fuel cell stack, and a pressure level in the fuel cell system.

5. New The fuel cell system according to claim 1, wherein the plurality of external devices includes at least one of a radiator fan, a cabin heater, a fuel cell stack heater, an air compressor, a battery charger, and an illumination device.

6. A fuel cell system comprising:
   a fuel cell stack having a plurality of fuel cells;
   an external electrical circuit adapted to receive current from the fuel cell stack;
   a plurality of sensors measuring a characteristic of fluid flowing into the fuel cell stack including a volume of the fluid injected into an anode supply manifold of the fuel cell stack, a voltage across at least one fuel cell, a current supplied from the fuel cell stack, a shut-down time period, and an environmental factor, wherein each of the sensors generates a sensor signal representing a measurement of the sensor;
   an adaptive load applied to the external electrical circuit; and
   a processor for receiving the sensor signals, analyzing the sensor signals, and controlling the adaptive load applied to the external electrical circuit based upon the analyzed sensor signals, the adaptive load operable to maintain a desired potential on each fuel cell during start-up, wherein the adaptive load comprises a plurality of external devices and a magnitude of the adaptive load is controlled by the processor selectively engaging the external devices.

7. The fuel cell system according to claim 6, wherein the adaptive load is an electrical load in electrical communication with the external electrical circuit, wherein a magnitude of the electrical load is modified in response to a measured current.

8. The fuel cell system according to claim 6, wherein at least one of the sensors obtains a measurement of the environmental condition, wherein the environmental condition is at least one of a temperature, a composition of a fluid flowing through the fuel cell stack, an age of the fuel cell stack, and a pressure level at various points in the fuel cell system.

9. The fuel cell system according to claim 6, wherein the processor includes a control-loop feedback mechanism.

10. A method for controlling a load applied to a fuel cell system,
    the method comprising the steps of:
    providing a fuel cell stack having a plurality of fuel cells, the fuel cell stack including an external electrical circuit in electrical communication with the fuel cell stack and adapted to receive current from the fuel cell stack;
    measuring a characteristic of fluid flowing into the fuel cell stack, an environmental condition affecting the fuel cell stack, and a voltage across at least one of the fuel cells; and
    controlling an adaptive load applied to the external electrical circuit based upon the measurement of the characteristic of the fluid flowing into the fuel cell stack, the environmental condition measured, and the voltage measured across at least one of the fuel cells, the adaptive load operating to maintain a desired potential on each fuel cell during start-up, wherein the adaptive load comprises a plurality of external devices and a magnitude of the adaptive load is controlled by the processor selectively engaging the external devices.

11. The method according to claim 10, wherein the controlling an adaptive load applied to the external electrical circuit is further based upon a current supplied from at least one fuel cell.

12. The method according to claim 10, wherein the adaptive load is a variable resistance load.

13. New The fuel cell system according to claim 6, wherein the plurality of external devices includes at least one of a radiator fan, a cabin heater, a fuel cell stack heater, an air compressor, a battery charger, and an illumination device.

14. The fuel cell system according to claim 10, wherein the environmental condition is at least one of a temperature, a composition of a fluid flowing through the fuel cell stack, an age of the fuel cell stack, and a pressure level at various points in the fuel cell system.

15. The fuel cell according to claim 10, wherein the processor includes a control-loop feedback mechanism.

16. New The method according to claim 10, wherein the plurality of external devices includes at least one of a radiator fan, a cabin heater, a fuel cell stack heater, an air compressor, a battery charger, and an illumination device.

* * * * *